United States Patent
Bhushan

(10) Patent No.: US 10,686,709 B2
(45) Date of Patent: Jun. 16, 2020

(54) METHODS AND APPARATUS FOR CHANNEL USAGE INDICATION

(71) Applicant: QUALCOMM Incorporated, San Diego, CA (US)

(72) Inventor: Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 14/597,116

(22) Filed: Jan. 14, 2015

(65) Prior Publication Data

US 2016/0014034 A1    Jan. 14, 2016

Related U.S. Application Data

(60) Provisional application No. 62/024,325, filed on Jul. 14, 2014.

(51) Int. Cl.
*H04L 12/815* (2013.01)
*H04W 24/08* (2009.01)
(Continued)

(52) U.S. Cl.
CPC ............ *H04L 47/22* (2013.01); *H04W 24/08* (2013.01); *H04W 28/0231* (2013.01);
(Continued)

(58) Field of Classification Search
CPC ............ H04W 72/1263; H04W 28/22; H04W 72/042; H04W 74/002; H04W 74/004;
(Continued)

(56) References Cited

U.S. PATENT DOCUMENTS 5,914,954 A * 6/1999 Nakayama ............ H04L 49/108
370/252
6,041,051 A * 3/2000 Doshi ................. H04L 12/2801
370/352
(Continued)

FOREIGN PATENT DOCUMENTS

CN      101072224 A    11/2007
CN      102823193 A    12/2012
(Continued)

OTHER PUBLICATIONS

International Search Report and Written Opinion—PCT/US2015/038286—ISA/EPO—dated Sep. 10, 2015.

*Primary Examiner* — Wutchung Chu
(74) *Attorney, Agent, or Firm* — Patterson + Sheridan, L.L.P.

(57) ABSTRACT

Certain aspects of the present disclosure generally relate to methods and apparatus for performing channel usage indication in a wireless communication environment. A transmitting apparatus may be configured to determine a residual length of an ongoing transmission burst including a plurality of segments. The transmitting apparatus may transmit, in at least one segment of the transmission burst, control information indicating the residual length of the ongoing transmission burst. A receiving apparatus may be configured to monitor a segment of the ongoing transmission burst, and to determine the residual length of the transmission burst, based on control information transmitted in the monitored segment.

15 Claims, 6 Drawing Sheets

Ln = residual length of n segments,
lm = idle period of m segments

(51) Int. Cl.
*H04W 28/02* (2009.01)
*H04W 28/06* (2009.01)
*H04W 74/08* (2009.01)
*H04L 1/16* (2006.01)

(52) U.S. Cl.
CPC ....... *H04W 28/06* (2013.01); *H04W 74/0816* (2013.01); *H04L 1/1671* (2013.01)

(58) Field of Classification Search
CPC .......... H04W 74/006; H04W 28/0252; H04W 28/0257; H04W 72/1268; H04W 72/1273; H04W 72/1278; H04W 72/1284; H04W 72/1289; H04W 72/1294; H04W 24/08; H04W 28/0231; H04W 28/06; H04W 74/0816; H04L 47/10; H04L 47/22; H04L 47/15; H04L 47/20; H04L 47/225; H04L 47/28; H04L 47/6255; H04L 1/1671
USPC ....................... 370/229–235; 455/512, 452.1
See application file for complete search history.

(56) References Cited

U.S. PATENT DOCUMENTS

| | | | | |
|---|---|---|---|---|
| 6,359,877 B1* | 3/2002 | Rathonyi | .............. | H04L 1/0002 370/232 |
| 6,456,632 B1* | 9/2002 | Baum | ..................... | H04L 45/04 370/392 |
| 6,493,342 B1* | 12/2002 | Breslow | ............. | H04B 7/18584 370/394 |
| 6,772,217 B1* | 8/2004 | Baumann | ................ | H04L 47/10 370/395.41 |
| 6,801,947 B1* | 10/2004 | Li | ..................... | H04L 29/06027 348/E5.008 |
| 6,909,723 B1 | 6/2005 | Yonge, III et al. | | |
| 7,187,654 B1* | 3/2007 | Beshai | .............. | H04Q 11/0066 370/230 |
| 7,535,841 B1* | 5/2009 | Beshai | ................ | H04L 12/5695 370/230.1 |
| 7,542,472 B1* | 6/2009 | Gerendai | ............. | H04L 1/1635 370/338 |
| 7,558,535 B2* | 7/2009 | Cho | ...................... | H04W 52/08 455/69 |
| 8,301,952 B2* | 10/2012 | Lee | ...................... | H04L 1/1887 370/310 |
| 8,417,828 B2* | 4/2013 | Ma | ........................ | H04L 65/608 709/231 |
| 8,514,886 B2* | 8/2013 | Bauchot | ............. | H04L 65/4076 370/232 |
| 8,670,427 B2 | 3/2014 | Fischer et al. | | |
| 9,226,191 B1* | 12/2015 | Vivanco | ............ | H04W 28/0231 |
| 9,674,318 B2* | 6/2017 | Pope | ....................... | H04L 69/16 |
| 2002/0095511 A1* | 7/2002 | Walker | ................. | H04L 1/1854 709/231 |
| 2002/0118388 A1* | 8/2002 | Honda | .................... | H04L 47/10 358/1.15 |
| 2003/0002449 A1 | 1/2003 | Rittle et al. | | |
| 2005/0013593 A1* | 1/2005 | Jung | .................... | H04N 9/8042 386/207 |
| 2006/0085552 A1* | 4/2006 | Sollenberger | ..... | H04W 52/0216 709/232 |
| 2007/0115995 A1* | 5/2007 | Kim | .................... | H04L 47/6255 370/392 |
| 2007/0162610 A1* | 7/2007 | Un | ........................ | H04L 1/0041 709/230 |
| 2009/0019183 A1* | 1/2009 | Wu | ....................... | H04L 5/0053 709/248 |
| 2009/0161746 A1* | 6/2009 | Mirbagheri | ............... | H04L 1/20 375/231 |
| 2009/0213807 A1* | 8/2009 | Lee | ........................ | H04L 5/0037 370/330 |
| 2009/0225783 A1* | 9/2009 | Ahn | .................... | H04B 7/0697 370/474 |
| 2010/0202289 A1* | 8/2010 | Madan | .................. | H04L 5/0037 370/230 |
| 2011/0002286 A1* | 1/2011 | Jeon | ....................... | H04W 72/06 370/329 |
| 2011/0128895 A1 | 6/2011 | Sadek et al. | | |
| 2011/0268069 A1* | 11/2011 | Song | ................. | H04W 72/1231 370/329 |
| 2011/0268200 A1 | 11/2011 | Yonge, III et al. | | |
| 2012/0020360 A1* | 1/2012 | Kubsch | ................. | H04L 1/1835 370/394 |
| 2012/0230348 A1* | 9/2012 | Pannell | ............... | H04L 47/6215 370/437 |
| 2013/0114962 A1* | 5/2013 | Oka | ..................... | H04L 7/042 398/67 |
| 2014/0010270 A1 | 1/2014 | Shi et al. | | |
| 2014/0064161 A1* | 3/2014 | Sikri | ................ | H04W 52/0209 370/311 |
| 2014/0169186 A1 | 6/2014 | Zhu et al. | | |
| 2014/0310405 A1* | 10/2014 | Pope | .................... | H04L 69/16 709/224 |
| 2015/0054656 A1* | 2/2015 | Hryciuk | ................ | G01S 5/0027 340/870.02 |
| 2015/0173122 A1* | 6/2015 | Schliwa-Bertling | ......................... | H04W 56/00 370/311 |
| 2017/0070781 A1* | 3/2017 | Bar Yanai | ........ | H04N 21/44245 |
| 2017/0163708 A1* | 6/2017 | Ramamurthy | ..... | H04N 21/2393 |

FOREIGN PATENT DOCUMENTS

| | | |
|---|---|---|
| EP | 2592765 A2 | 5/2013 |
| JP | 2005529506 A | 9/2005 |
| JP | 2013527647 A | 6/2013 |
| WO | 03069885 A2 | 8/2003 |
| WO | WO-2007075784 A2 | 7/2007 |
| WO | WO-2009035983 A1 | 3/2009 |
| WO | WO-2010091119 | 8/2010 |

* cited by examiner

METHODS AND APPARATUS FOR CHANNEL USAGE INDICATION

CLAIM OF PRIORITY UNDER 35 U.S.C. § 119

The present application for patent claims priority to U.S. Provisional Application No. 62/024,325, entitled "METHODS AND APPARATUS FOR CHANNEL USAGE INDICATION", filed Jul. 14, 2014, and assigned to the assignee hereof and expressly incorporated by reference herein.

BACKGROUND

Technical Field

Certain aspects of the present disclosure generally relate to methods and apparatus for indication of channel usage in a wireless communication environment.

Introduction

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure provide a method for wireless communications by an apparatus is provided. The method may generally include monitoring a segment of a transmission burst comprising a plurality of segments, and determining a residual length of the ongoing transmission, based on control information transmitted in the monitored segment.

Certain aspects of the present disclosure provide an apparatus for wireless communication. The apparatus may generally include means for monitoring a segment of an ongoing transmission burst comprising a plurality of segments, and means for determining a residual length of the ongoing transmission burst, based on control information transmitted in the monitored segment.

Certain aspects of the present disclosure provide a computer-readable comprising code executable by one or more processors for monitoring a segment of an ongoing transmission burst comprising a plurality of segments, and determining a residual length of the ongoing transmission burst, based on control information transmitted in the monitored segment.

Certain aspects of the present disclosure provide a method for wireless communications by an apparatus. The method may generally include determining a residual length of a transmission burst comprising a plurality of segments, and transmitting, in at least one segment of the transmission burst, control information indicating the residual length of the ongoing transmission burst.

Certain aspects of the present disclosure provide an apparatus for wireless communication. The apparatus may generally include means for determining a residual length of an ongoing transmission burst comprising a plurality of segment, and means for transmitting, in at least one segment of the transmission burst, control information indicating the residual length of the ongoing transmission burst.

Certain aspects of the present disclosure provide a computer-readable medium for wireless communication comprising code executable by one or more processors for determining a residual length of an ongoing transmission burst comprising a plurality of segments, and transmitting, in at least one segment of the transmission burst, control information indicating the residual length of the ongoing transmission burst.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
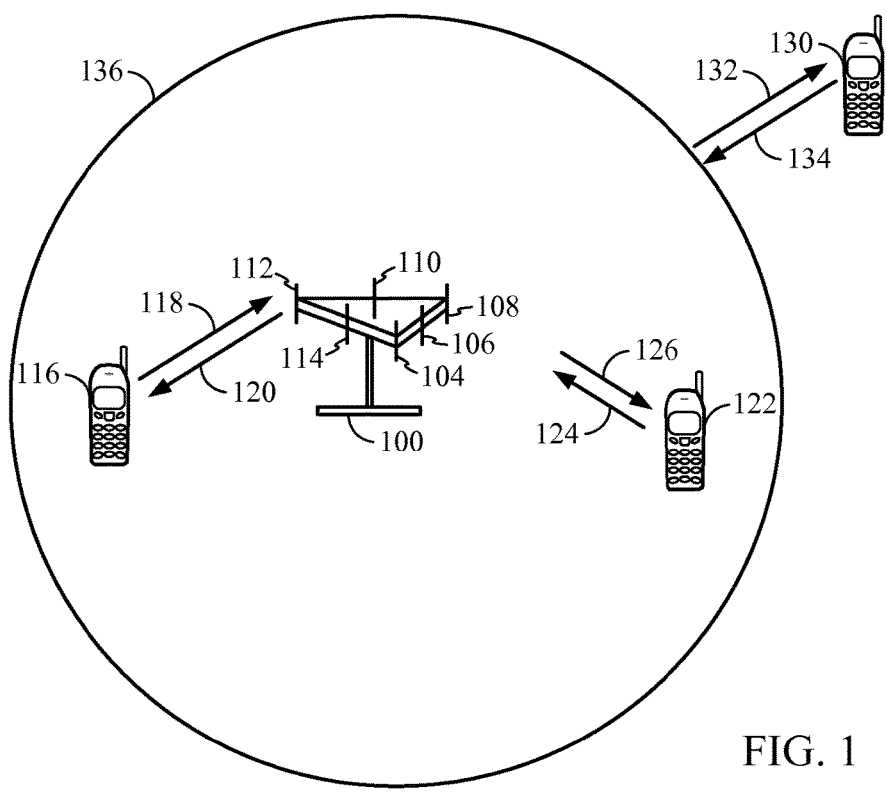
FIG. 1 illustrates an example multiple access wireless communication system in accordance with certain aspects of the present disclosure.

It has been found that a bursty transmission from a transmitting device may lead to rapidly changing interference for one or more other devices (e.g., a non-target receiver) in vicinity of the transmitting device, which is hard to predict and counteract. Certain aspects of the present disclosure provide techniques, as described herein, which may be implemented by one or more neighboring devices for indication and effective usage of at least one of a residual length of an ongoing transmission burst, a priority of the transmission burst, or duration between two transmission bursts. For example, a transmitting device may be configured to determine a residual length of an ongoing transmission burst (e.g., remaining number of burst segments of the transmission burst), and transmit, in at least one segment of the transmission burst, control information indicating the residual length of the ongoing transmission burst. A neighboring device may be configured to monitor at least one segment of an ongoing transmission burst, and to determine the residual length of the ongoing transmission burst, based on control information received in the monitored segment. Additionally, a transmitting device may be configured to determine a duration between transmission bursts and to transmit, for example, in a last segment of an ongoing transmission burst, control information indicating the duration, after the ongoing transmission burst ends, before a start of a next transmission burst.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD (Frequency Division Duplex) system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

Access terminal 130 may be in communication with access point 100, where antennas from the access point 100 transmit information to access terminal 130 over forward link 132 and receive information from the access terminal 130 over reverse link 134.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

As noted above, a bursty transmission from a transmitter (e.g. one of AP 100 or one of AT 116, 122, or 130) may lead to rapidly changing interference for a link of a non-target receiver (e.g., another AP or other one of AT 116, 122, or 130), that is hard to predict and counteract. Thus, according to certain aspects of the present disclosure, the AP 100 and one or more of the access terminals (e.g., 116, 122, 130) may implement methods of channel usage indication, as described herein, to enable non-target receivers to determine at least one of a residual length of an ongoing transmission burst, priority of the ongoing transmission burst, or time interval between bursts. For example, in certain aspects, AT 116 may be configured to transmit, in at least one segment of an ongoing transmission burst, control information indicating the residual length of the burst (e.g., a remaining number of burst segments). AT 122 (and/or AT 130) may be configured to monitor at least one segment of the ongoing transmission burst (by AT 116) and determine the residual length of the transmission burst. In response to determining the residual length of the ongoing transmission burst, the AT 122 (and/or AT 130) may be configured to power down one or more radio components during the determined residual length of the transmission burst. Additionally or alternatively, the AT 122 (and/or AT 130) may be configured to transmit at a reduced spectral efficiency, relative to a spectral efficiency of communications between transmission bursts, during the residual length of the transmission burst.

In certain aspects, the AT 116 may also be configured to determine and transmit a time duration between transmission bursts, for example in a last segment of the ongoing transmission burst. The AT 122 (and/or AT 130) may be configured to communicate at an increased spectral efficiency during one or more segments in between transmission bursts, relative to a spectral efficiency of communications during transmission bursts.

Figure 2:
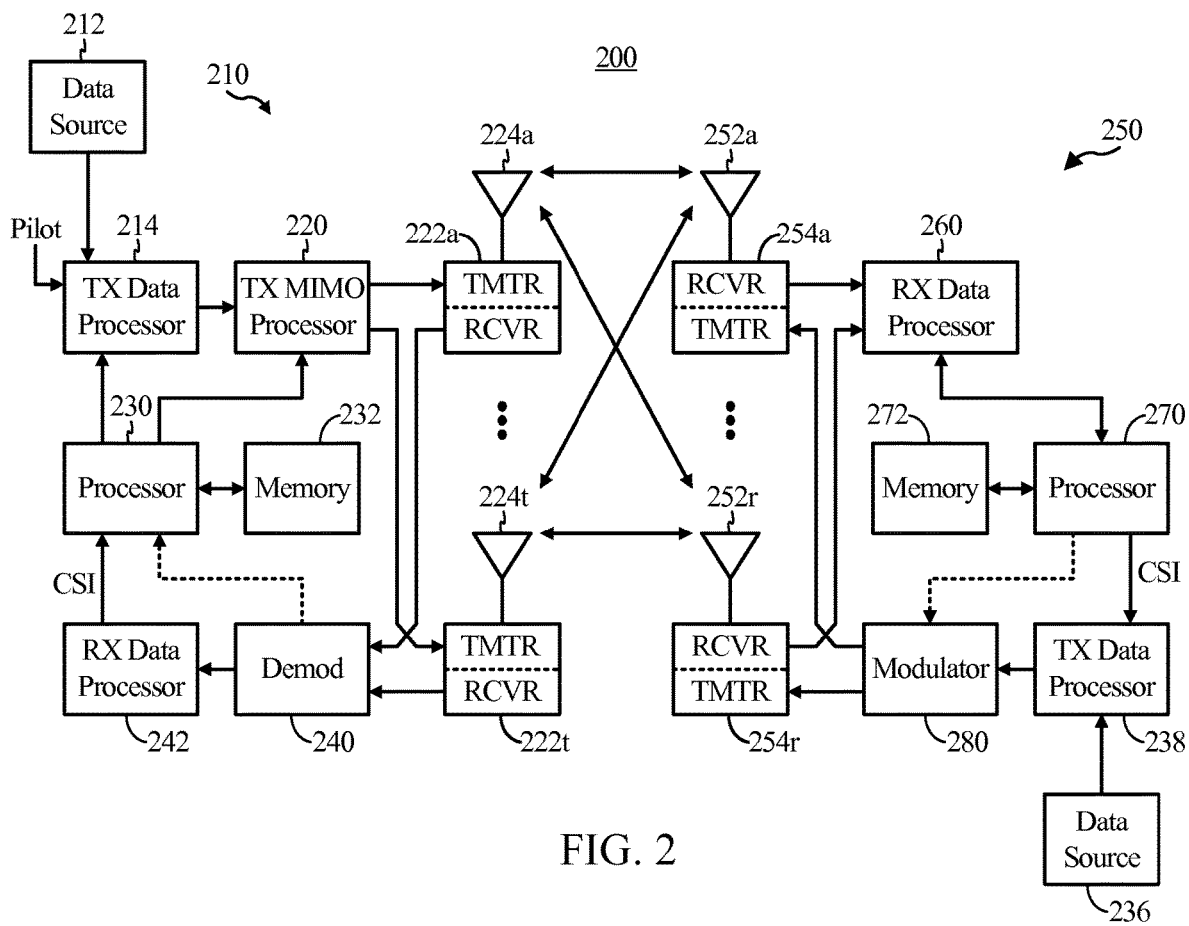
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In certain aspects, any one of the processor 230, TX data processor 214, and TX MIMO processor 220, or a combination thereof of the transmitter system 210, and any one of the processor 270 and TX data processor 238, or a combination thereof of the receiver system 250 may be configured to perform the transmitter side operations of the methods of channel usage indication as discussed herein. Further, any one of the processor 230 and RX data processor 242, or a combination thereof of the transmitter system 210, and any one of the processor 270 and RX data processor 260 of the receiver system 250, or a combination thereof may implement receiver side operations of the methods of channel usage indication as discussed herein. In an aspect, for the transmitter system 210, any one of the processor 230, TX data processor 214, TX MIMO processor, and RX data processor 242 may be configured to execute algorithms stored in memory 232 for performing the methods of channel usage indication as discussed herein. In an aspect, for the receiver system 250, at least one of the processor 270, RX data processor 260, and TX data processor 238 may be configured to execute algorithms stored in memory 272 for performing the methods of channel usage indication discussed herein.

For example, one or more of the processors 214, 220, and 230 at the transmitter system 210 may be configured to determine a residual length of an ongoing transmission burst including a plurality of segments. Transmitter(s) 222 at the transmitter system 210 may be configured to transmit, in at least one segment of the transmission burst, control information indicating the residual length of the transmission burst. Additionally or alternatively, the one or more processors 214, 220, and 230 may also be configured to determine a time duration between the ongoing transmission burst and start of the next transmission burst. The transmitter(s) 222 may be configured to transmit control information including the determined time duration between transmission bursts, for example, in a last segment of the ongoing transmission burst.

Receiver(s) 254 at the receiver system 250 may be configured to monitor a segment of an ongoing transmission burst including a plurality of segments. One or more of the processors 260 and 270 may be configured to determine, a residual length of the transmission burst, based on control information transmitted in the monitored segment. Additionally or alternatively, the receiver(s) 254 may be configured to monitor a last segment of the ongoing transmission burst. The one or more processors 260 and 270 may be configured to determine a duration between the ongoing transmission burst and start of the next transmission burst, based on control information included in the last segment.

Figure 3:
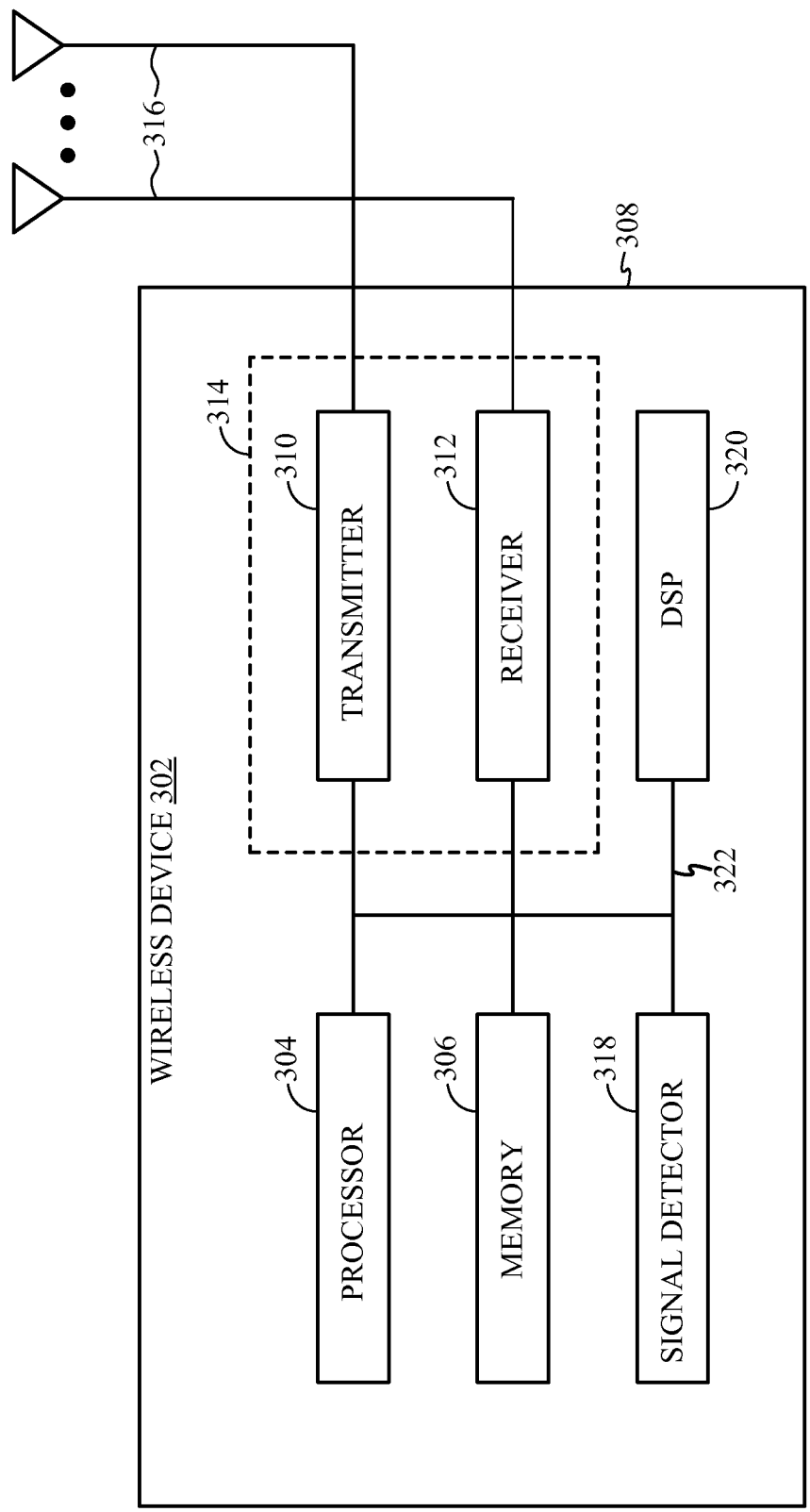
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus. The processor 304 may be configured to access instructions stored in the memory 306 to perform the methods of channel usage indication as discussed herein, for example, operations 400 of FIG. 4 and operations 500 of FIG. 5.

Example Methods and Apparatus for Channel Usage Indication

Certain standards that help define the air interface for wireless communications has traditionally been grouped into generations, for example, with 3G and 4G referring to groups of standards for 3rd generation and 4th generation air interfaces.

Advanced air interfaces, such as an air interface referred to as a Unified Air Interface (UAI-which may be considered a 5G air interface), may need to fulfill many diverse requirements. These requirements may include efficient operation in licensed, unlicensed, and shared spectrums, support for low (sub 10 GHz) and high (mmW) frequency bands, support for normal and very low latency traffic, support for different channel environments including normal (outdoor) and low (indoor) delay-spread, and support for throughput-intensive and energy-constrained (low duty cycle) modes of operation with massive connection volume.

In some cases, communicating with an "agile" waveform that may be turned on and off in a dynamic fashion without a pre-announced schedule (e.g., a bursty waveform) may be highly beneficial in meeting the requirements noted above. These bursty waveforms may be beneficial both for spectrum sharing (unlicensed spectrum) and energy savings (with components powered down between transmissions).

However, bursty waveforms lead to rapidly fluctuating interference that may be difficult for other links to predict for the purposes of rate control and power-efficient, TDM-based channel sharing. In conventional WiFi transmissions (e.g., defined by the 802.11 family of standards), the preamble of each PPDU and MAC header of each MPDU contains a duration field that specifies the length of the current packet/transaction, allowing non-targeted devices to know how long to defer (refrain from transmitting potentially interfering signals). Unfortunately, a non-target receiver that misses the beginning of the packet, misses the duration field and does not know how long to stay off the medium.

Aspects of the present disclosure, however, may provide a signaling mechanism that provides, at different times in a transmission of a burst, information about a remaining or "residual" length of the transmission.

For certain aspects of the present disclosure, transmissions may occur in a burst of segments. In some cases, a segment may define a minimum granularity (in time) for a transmission. After a burst of segments, a transmitter may be turned OFF. In certain aspects, each transmission burst may contain an integer number of segments. In an aspect, the timing of burst segments adheres to a segment clock and each segment and/or burst may begin at predefined clock boundaries. A network may broadcast configuration information (e.g. in a System Information Block) including the timing of a burst and/or segments of the burst.

In certain aspects, a device may facilitate interference prediction by transmitting (e.g., broadcasting) control information including channel usage indication signals within the bursty waveform. For example, the burst transmission may include periodic indication of a remaining length of the burst including, for example, a remaining number of segments of the burst. This may allow a non-target receiver (e.g., a victim receiver whose link is being interfered by the bursty signal) to listen to an ongoing packet transmission for a short duration of time and determine a residual length of the current burst. Further, since the indication is transmitted periodically, the receiver has multiple opportunities to monitor the signal and determine the remaining duration of the burst.

Figure 4:
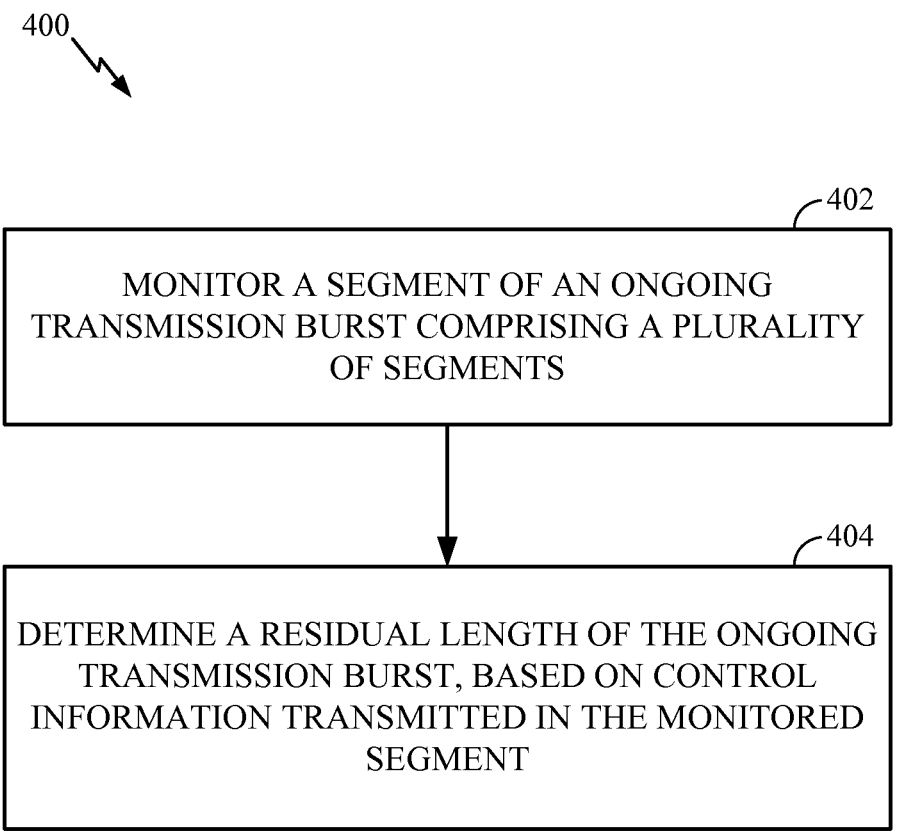
FIG. 4 illustrates example operations that may be performed by a receiver, for receiving and processing channel usage indication, in accordance with certain aspects of the present disclosure.

FIG. 4 illustrates example operations 400 that may be performed by an apparatus (e.g., a non-target receiver), for receiving and processing channel usage indication, in accordance with certain aspects of the present disclosure.

Operations 400 may begin, at 402, by monitoring a segment of an ongoing transmission burst including a plurality of segments. At 404, the apparatus may determine a residual length of the ongoing transmission burst, based on control information transmitted in the monitored segment.

Figure 5:
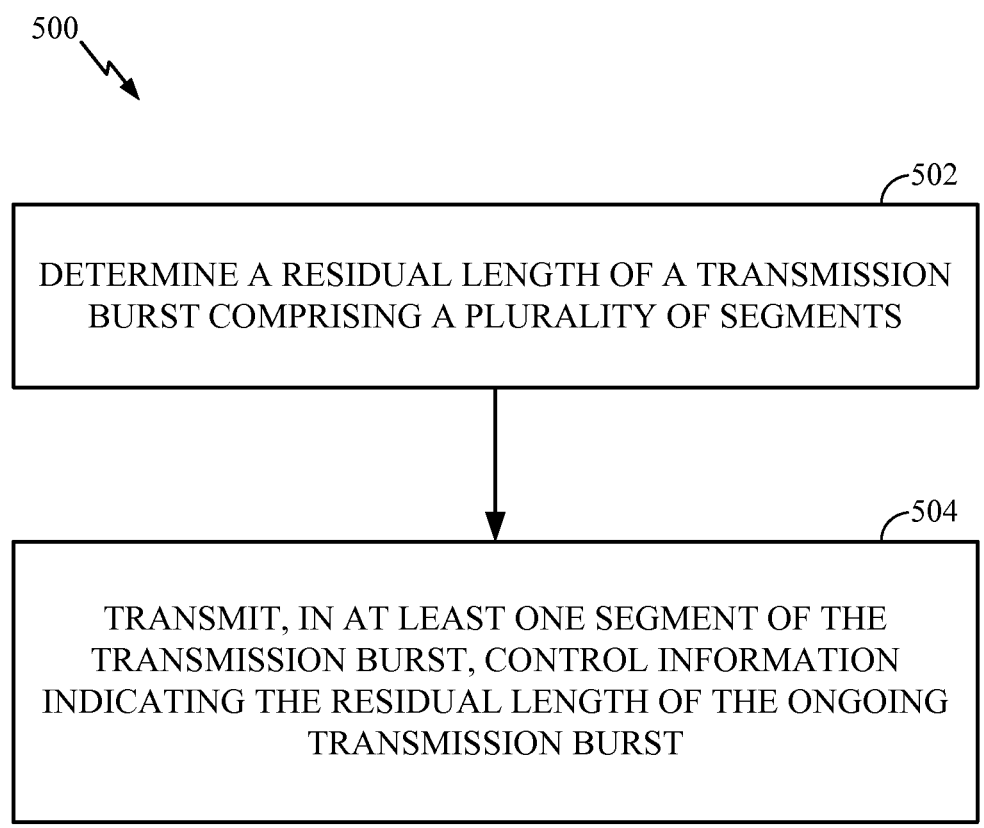
FIG. 5 illustrates example operations that may be performed by a transmitter, for performing channel usage indication, in accordance with certain aspects of the present disclosure.

FIG. 5 illustrates example operations 500 that may be performed by an apparatus (e.g., a transmitter), for performing channel usage indication, in accordance with certain aspects of the present disclosure. The operations 500 may be considered transmitter-side operations that are complementary to operations 400.

Operations 500 may begin, at 502, by determining a residual length of an ongoing transmission burst including a plurality of segments. At 504, the apparatus may transmit, in at least one segment of the transmission burst, control information indicating the residual length of the ongoing transmission burst.

The residual length information may be provided in any suitable format. In some cases, residual length information may be provided in each segment of a transmission. In other cases, residual length may be provided in multiple, but not all, segments (e.g., every other segment or otherwise periodically).

For example, each segment of a transmission burst may carry a "residual-length down counter signal" whose value is equal to the number of remaining segments in the burst after the segment, the counter being decremented each successive segment of the transmission burst. Thus, in certain aspects, a neighboring non-target receiver may monitor the burst signal for at most one segment, in order to determine the time-interval (e.g., remaining number of segments) over which the burst signal will remain ON. In an aspect, the non-target receiver (e.g., victim node) may power down one or more radio components of the receiver during this time interval until the last segment of the current burst to save power. In an aspect, the non-target receiver may use its own link at a reduced spectral efficiency (e.g., reduced MCS/data rate) over this time interval, as compared to a spectral efficiency of communications between transmission bursts, and defer high rate transmission until end of the burst.

In certain aspects, additionally or alternatively the transmission burst may include an expected time interval between the current burst and the next burst, for example, towards the end of the burst. For instance, the last segment of the burst may include an "idle-length signal" whose value is equal to the number of segments (e.g., minimum number of segments) over which the transmission will be turned off. In an aspect, a non-target receiver may determine the last segment of the burst from the residual-length down-counter signal and then monitor the last segment for the idle-length signal. From the idle-length signal, the non-target receiver may determine a potential interference-free (or limited interference) duration over which it may use the channel more freely. For example, the non-target receiver may communicate at an increased spectral efficiency relative to a spectral efficiency of communications during transmission bursts, during one or more of the segments between transmission bursts.

Figure 6:
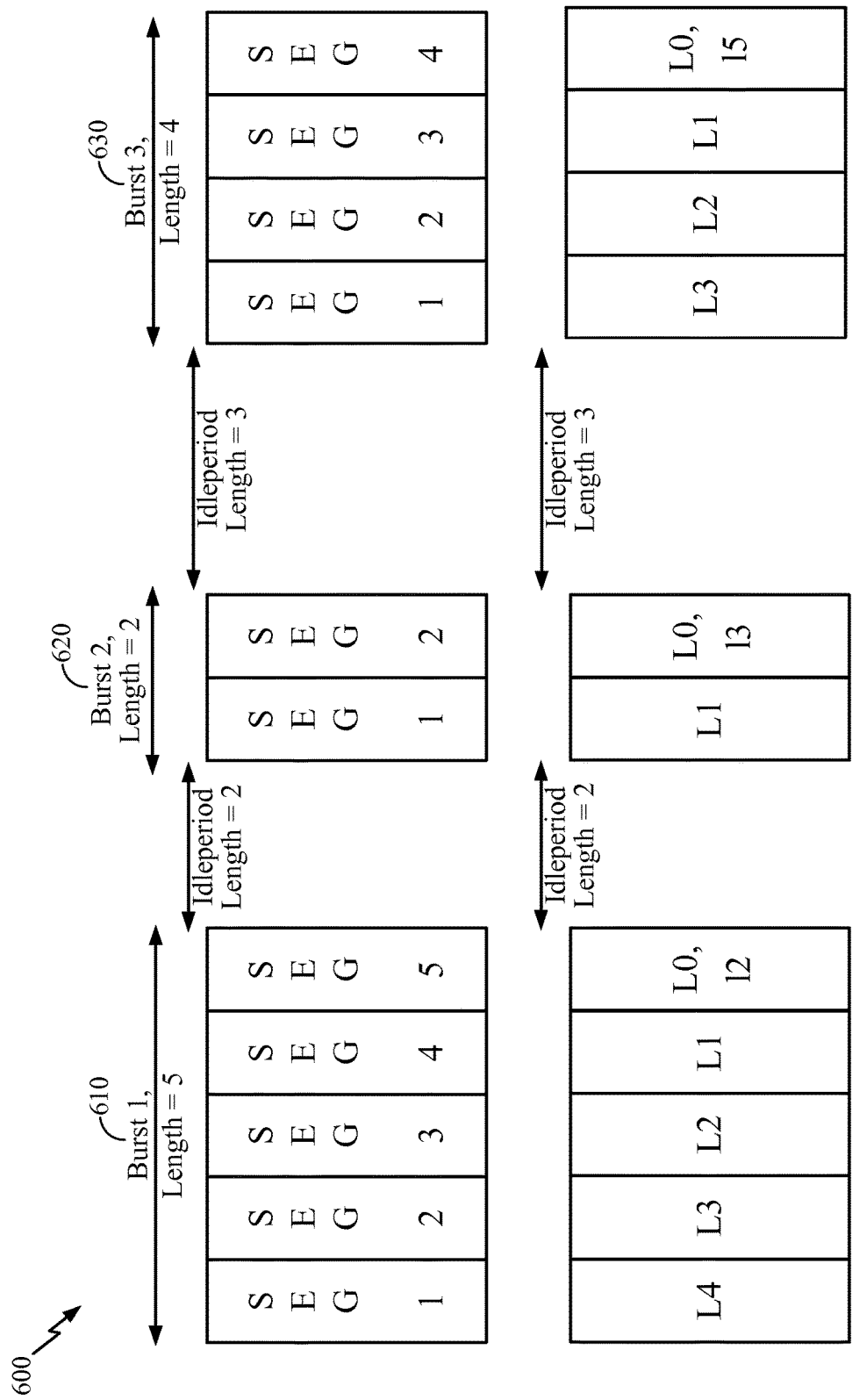
FIG. 6 illustrates the transmission of channel usage indication signals in transmission bursts, in accordance with certain aspects of the present disclosure.

FIG. 6 illustrates, graphically, an example transmission 600 of channel usage indication signals, in accordance with certain aspects of the present disclosure. The transmission 600 may be generated, for example, by a transmitter performing the operations 500 of FIG. 5 described above.

In the illustrated example transmission 600, transmission burst 1 610 is five segments long and includes segments SEG1 to SEG5, transmission burst 2 620 is two segments long and includes segments SEG1 to SEG2, and transmission burst 3 630 is four segments long and includes segments SEG1 to SEG4.

As shown in FIG. 6, each segment of each of the transmission bursts 1 to 3 carries the residual-length down-counter signal Ln indicating a residual length of the burst as n segments. As shown, the counter decrements each successive segment. For instance, for burst 1 610, segments SEG1 to SEG5 carry counter signals L4 to L0 respectively. Similarly for burst 2 620, segments SEG 1 and SEG 2 carry counter signals L1 and L0 respectively, and for burst 3 630, segments SEG1 to SEG4 carry counter signals L3 to L0 respectively.

As also shown in FIG. 6, the last segment of each burst (e.g., 610, 620, and 630) carries an idle-length signal 1 m indicating an idle period between the current burst and the next burst in m segments. For instance, segment SEG5 of burst 1 610 carries 12, indicating that the idle period between burst 1 610 and burst 2 620 is 2 segments. Similarly, segment SEG2 of burst 2 620 carries 13 indicating that the idle period between bursts 2 620 and burst 3 630 is 3 segments, and segment SEG4 of burst 3 630 carries 15 indicating that the idle period between burst 3 630 and the next burst (not shown) is 5 segments.

In certain aspects, an aggressor node that wants to facilitate higher priority traffic of a victim node whose link is being interfered by the aggressor node's transmission (which may interfere with a "victim node's" transmission), may listen to transmission (e.g., bursty transmission) from the victim node to determine a remaining burst duration, and defer its low priority traffic until the end of the high priority transmission burst. In this case, the node receiving the residual length control information is the aggressor node. In an aspect, the aggressor node may monitor and determine the idle time between high priority bursts of the victim and schedule its own lower priority transmissions during the idle time.

In certain aspects, the priorities of the nodes and/or types of traffic for each node may be configured by the network. In certain aspects, each node may periodically advertise a priority level of its transmission in the burst, in addition to the residual length of the burst. In an aspect, a device may include control information indicating priority of an ongoing transmission burst in each segment of the transmission burst along with the residual length information.

Figure 7:
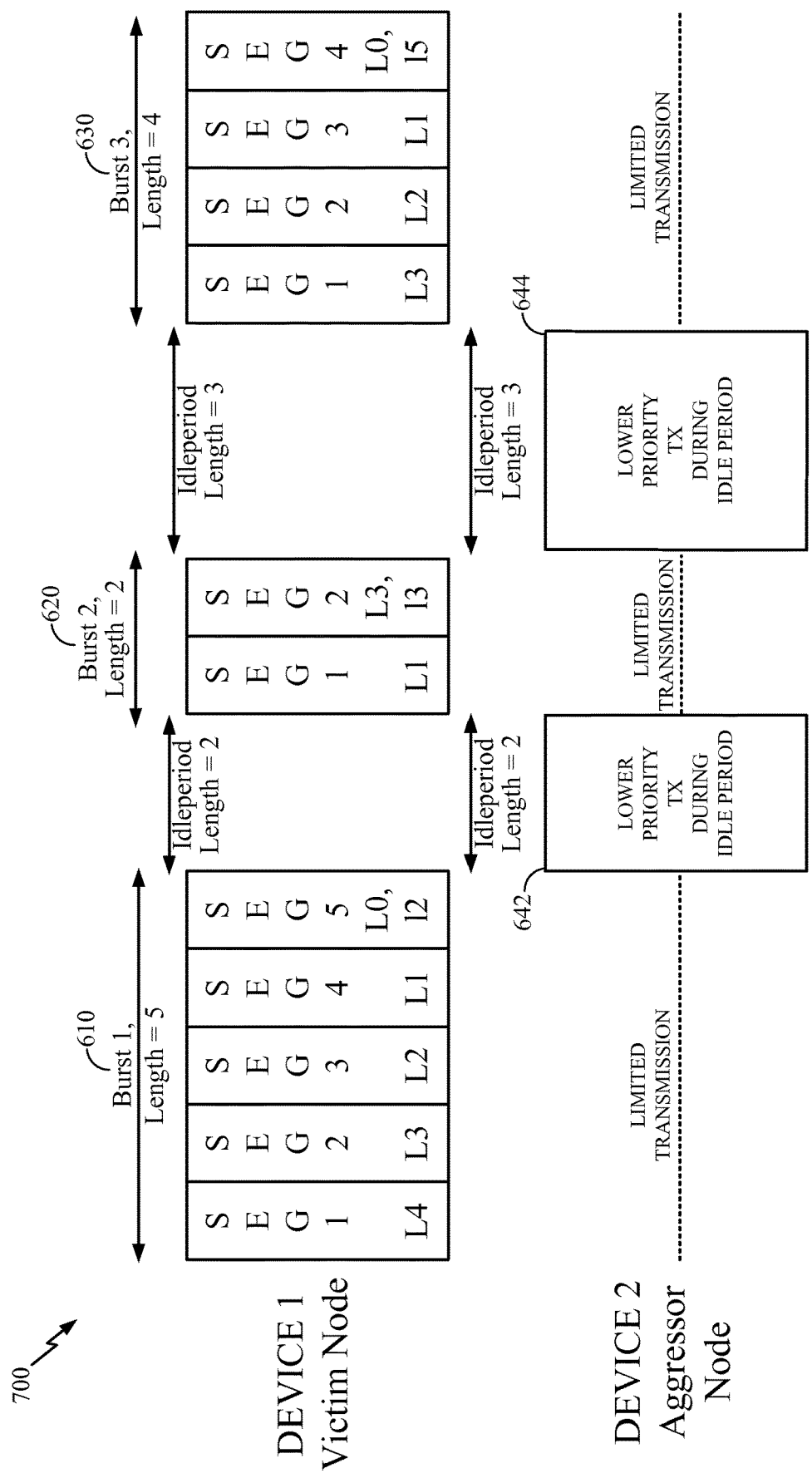
FIG. 7 illustrates an example transmission of channel usage indication signals by a device to enable transmission of higher priority traffic by the device, in accordance with certain aspects of the present disclosure.

FIG. 7 illustrates an example transmission 700 of channel usage indication signals by a device to enable transmission of higher priority traffic by the device, in accordance with certain aspects of the present disclosure. In the example of FIG. 7, Device 1 is a victim node experiencing interference from aggressor node Device 2. As shown in FIG. 7, Device 1 transmits residual length down counter signal Ln in each segment of Device 1's bursty transmission. Further, Device 1 also transmits idle length signal 1 m in the last segment of each transmission burst (e.g., Bursts 610, 620, and 630), indicating idle period between the bursts as number of segments m.

In certain aspects, Device 2 may facilitate transmission of higher priority traffic by Device 1, by limiting its lower priority transmission when Device 1 is transmitting its higher priority traffic. For example, Device 2 may monitor a segment of an ongoing transmission burst by Device 1 and determine the residual length of the ongoing transmission burst. Device 2 may then limit its lower priority transmission for the determined residual length of the ongoing transmission burst. For example, Device 2 may transmit at lower power or not transmit at all.

According to certain aspects, Device 2 may monitor the last segment of the ongoing transmission burst to determine an idle period between the ongoing burst and the start of a next transmission burst by Device 1, and conduct its own lower priority transmission during the determined idle period. As shown in FIG. 7, Device 2 performs limited transmission (or no transmission) when Device 1 is transmitting, for example, during Bursts 610, 620, and 630.

On the other hand, upon learning of an idle time (of length 2) after Burst 1, Device 2 may transmit its lower priority traffic (at 642) for two segment periods between Bursts 1 and 2. Similarly, upon learning of an idle time (of length 3) after Burst 2, Device 2 may again transmit lower priority data (at 644) for three segment periods between Bursts 2 and 3. The transmissions by Device 2 may or may not be bursty (e.g., and may also indicate a residual length).

While in the above discussed aspects of the disclosure, the concept of a transmission segment fulfills two roles including forming the basis for the minimum quantum in terms of which burst length is measured and also defining a periodicity with which residual-length is indicated. These two roles may be decoupled. For example, while the burst may be measured in terms of segments, the residual burst length may be advertised with some specified periodicity, which may have a granularity different from one segment.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication by an apparatus, comprising:
    monitoring a segment of an ongoing transmission burst comprising a plurality of segments;
    determining a residual length of the ongoing transmission burst, based on control information transmitted in the monitored segment, wherein the control information comprises a residual-length down counter, wherein a value of the residual-length down counter is equal to a number of segments remaining in the transmission burst after the monitored segment, wherein the counter is decremented in each successive segment of the ongoing transmission burst;
    powering down one or more radio components during the residual length of the transmission burst;
    monitoring a last segment of the transmission burst; and
    determining a duration between transmission bursts, based on control information included in the last segment, wherein the control information included in the last segment indicates the duration between transmission bursts as a number of segments between transmission bursts.

2. The method of claim 1, wherein:
    the control information is transmitted periodically but not in each segment; and
    monitoring the segment comprises monitoring a segment in which the control information is transmitted.

3. The method of claim 1, wherein a segment comprises a minimum time-unit over which a waveform of the transmission burst is transmitted.

4. The method of claim 1, further comprising:
    communicating at a reduced spectral efficiency, relative to a spectral efficiency of communications between transmission bursts, during the residual length of the transmission burst.

5. The method of claim 1, further comprising:
    communicating at an increased spectral efficiency, relative to a spectral efficiency of communications during transmission bursts, during one or more of the segments between transmission bursts.

6. The method of claim 1, further comprising:
    determining a priority of the ongoing transmission burst, based on control information transmitted in the monitored segment.

7. An apparatus for wireless communication, comprising:
    means for monitoring a segment of an ongoing transmission burst comprising a plurality of segments; and
    means for determining a residual length of the ongoing transmission burst, based on control information transmitted in the monitored segment, wherein the control information comprises a residual-length down counter, wherein a value of the residual-length down counter is equal to a number of segments remaining in the transmission burst after the monitored segment, wherein the counter is decremented in each successive segment of the ongoing transmission burst;
    means for powering down one or more radio components during the residual length of the transmission burst;
    means for monitoring a last segment of the transmission burst; and
    means for determining a duration between transmission bursts, based on control information included in the last segment, wherein the control information included in the last segment indicates the duration between transmission bursts as a number of segments between transmission bursts.

8. A non-transitory computer-readable medium comprising code executable by one or more processors for:
monitoring a segment of an ongoing transmission burst comprising a plurality of segments; and
determining a residual length of the ongoing transmission burst, based on control information transmitted in the monitored segment, wherein the control information comprises a residual-length down counter, wherein a value of the residual-length down counter is equal to a number of segments remaining in the transmission burst after the monitored segment, wherein the counter is decremented in each successive segment of the ongoing transmission burst;
powering down one or more radio components during the residual length of the transmission burst;
monitoring a last segment of the transmission burst; and
determining a duration between transmission bursts, based on control information included in the last segment, wherein the control information included in the last segment indicates the duration between transmission bursts as a number of segments between transmission bursts.

9. A method for wireless communication by an apparatus, comprising:
determining a residual length of an ongoing transmission burst comprising a plurality of segments;
transmitting, in at least one segment of the transmission burst, control information indicating the residual length of the ongoing transmission burst, wherein the control information comprises a residual-length down counter, wherein a value of the residual-length down counter is equal to a number of segments remaining in the transmission burst after the at least one segment, wherein the counter is decremented in each successive segment of the ongoing transmission burst;
determining a duration between transmission bursts; and
transmitting, in a last segment of the transmission burst, control information indicating the duration before a start of a next transmission burst, wherein the control information transmitted in the last segment indicates the duration before the start of the next transmission burst as a number of segments between transmission bursts.

10. The method of claim 9, wherein:
the control information is transmitted periodically, but not in each segment.

11. The method of claim 9, wherein a segment comprises a minimum time-unit over which a waveform of the transmission burst is transmitted.

12. The method of claim 9, wherein control information indicating the residual length of the transmission burst is transmitted in each segment of the transmission burst.

13. The method of claim 9, further comprising:
transmitting, in the at least one segment of the ongoing transmission burst, a priority of the ongoing transmission burst.

14. An apparatus for wireless communication, comprising:
means for determining a residual length of an ongoing transmission burst comprising a plurality of segments;
means for transmitting, in at least one segment of the transmission burst, control information indicating the residual length of the ongoing transmission burst, wherein the control information comprises a residual-length down counter, wherein a value of the residual-length down counter is equal to a number of segments remaining in the transmission burst after the at least one segment, wherein the counter is decremented in each successive segment of the ongoing transmission burst;
means for determining a duration between transmission bursts; and
means for transmitting, in a last segment of the transmission burst, control information indicating the duration before a start of a next transmission burst, wherein the control information transmitted in the last segment indicates the duration before the start of the next transmission burst as a number of segments between transmission bursts.

15. A non-transitory computer-readable medium for wireless communication comprising code executable by one or more processors for:
determining a residual length of an ongoing transmission burst comprising a plurality of segments;
transmitting, in at least one segment of the transmission burst, control information indicating the residual length of the ongoing transmission burst, wherein the control information comprises a residual-length down counter, wherein a value of the residual-length down counter is equal to a number of segments remaining in the transmission burst after the at least one segment, wherein the counter is decremented in each successive segment of the ongoing transmission burst;
determining a duration between transmission bursts; and
transmitting, in a last segment of the transmission burst, control information indicating the duration before a start of a next transmission burst, wherein the control information transmitted in the last segment indicates the duration before the start of the next transmission burst as a number of segments between transmission bursts.

* * * * *